United States Patent [19]

Crisanti

[11] Patent Number: 4,930,251
[45] Date of Patent: Jun. 5, 1990

[54] INSECT TRAP

[76] Inventor: Joseph S. Crisanti, 16 Ladwood Dr., Holmdel, N.J. 07733

[21] Appl. No.: 359,732

[22] Filed: May 31, 1989

[51] Int. Cl.$^5$ .............................................. A01M 1/20
[52] U.S. Cl. ...................................... 43/107; 43/114; 43/121; 43/122
[58] Field of Search ................... 43/107, 114, 121, 122

[56] References Cited

U.S. PATENT DOCUMENTS

| | | |
|---|---|---|
| 134,444 | 12/1872 | Stell . |
| 501,686 | 7/1893 | Moskowitz . |
| 713,803 | 11/1902 | Rothweiler . |
| 818,836 | 4/1906 | Lenthier et al. . |
| 821,913 | 5/1906 | Wilson ................................. 43/107 |
| 878,207 | 2/1908 | Kessler . |
| 920,696 | 5/1909 | Turner . |
| 1,015,643 | 1/1912 | Serafinski . |
| 1,194,736 | 8/1916 | Holden . |
| 1,511,682 | 10/1924 | Skelly ................................. 43/107 |
| 1,623,439 | 4/1927 | Rawlings ............................. 43/107 |
| 1,700,517 | 1/1929 | Ross ..................................... 43/121 |
| 1,714,368 | 5/1929 | Hobson ................................ 43/121 |
| 1,723,919 | 8/1929 | Bykowy . |
| 1,862,325 | 6/1932 | Watson . |
| 2,478,104 | 8/1949 | Johnson ............................... 43/122 |
| 3,550,308 | 12/1970 | Ibach . |
| 3,708,908 | 1/1973 | Levey . |
| 3,863,384 | 2/1975 | Weatherston et al. . |
| 3,968,590 | 7/1976 | Kitterman . |
| 4,030,233 | 6/1977 | Wunsche . |
| 4,263,740 | 4/1981 | Hemsarth et al. . |
| 4,316,344 | 2/1982 | Carlsen ................................ 43/114 |
| 4,400,903 | 8/1983 | Seidenberger . |
| 4,476,647 | 10/1984 | Hall, Jr. . |
| 4,490,938 | 1/1985 | Baker . |
| 4,505,065 | 3/1985 | Niemeyer . |
| 4,551,941 | 11/1985 | Schneidmiller ..................... 43/107 |
| 4,581,845 | 4/1986 | Burkholder et al. . |
| 4,592,163 | 6/1986 | Wilson ................................ 43/107 |
| 4,718,193 | 1/1988 | Rosselli . |
| 4,802,303 | 2/1989 | Floyd .................................. 43/114 |

OTHER PUBLICATIONS

"Cultivating Carnivorous Plants" by Allan A. Swenson, pp. 50-53, 61-69, 96-97.

Primary Examiner—Kurt Rowan
Attorney, Agent, or Firm—Lerner, David, Littenberg, Krumholz & Mentlik

[57] ABSTRACT

An insect trap of the non-toxic adhesive type is constructed from a housing suitably sized for trapping flying insects and the like. The housing, which may be constructed in a decorative and ornamental manner, is provided with a top which is longitudinally moveable relative to the housing base to provide an opening for insect egress to the interior of the trap. The interior surfaces of the top and base may be coated with an adhesive layer to trap insects therein. A portion of the base adjacent the opening is provided with a slippery surface to promote entrance of flying insects within the trap. An attractant odor producing substance is received within the housing and exposed to the interior thereof upon displacing the top from its closed to open position.

19 Claims, 2 Drawing Sheets

INSECT TRAP

BACKGROUND OF THE INVENTION

The present invention relates in general to an insect trap, and more particularly, to a non-toxic, adhesive type trap for trapping flying type insects using a bait or scented lure, although it will be appreciated that the present invention may be used for trapping other types of insects such as crawling insects and the like.

The trapping of insects in nature is uniquely achieved by a number of carnivorous type plants, such as the species of pitcher plants, for example, huntsman's horns, sweet trumpets and cobra lilies. The control of insects in the home, garden and in commercial growing operations must be performed in an artificial manner, typically, by treating with an appropriate insecticide or pesticide. Typical commercially available insecticides contain lindane, malathion or compounds of organic phosphors, and are applied in the form of aerosol sprays, dusts or as powders. All of these compounds can be particularly irritating to humans and animals, and in some cases, can cause illness or even death in the instance of children or sensitive individuals. Accordingly, great care must be used in applying these chemicals to avoid contact with humans and animals. As a result of the inherent dangers involved in the use of insecticide and pesticide sprays and dusts, other means have been sought to control the insect population.

One method commonly used is to provide an insect device which traps the insects in a tacky or gummy substance. For example, the well-known household fly paper rolls work in this manner, trapping insects when they come in contact with the gummy surface of the paper. Conventional fly paper rolls have only exhibited limited effectiveness, having primary application for household use. Additionally, since the tacky surface is exposed, esthetic and sanitary objections to the use of this type of trap are common. Insect traps of this type utilizing tacky surfaces are known from U.S. Pat. Nos. 501,686, 878,207, 1,194,736, 1,015,643 and 1,723,919.

In order to overcome the objections to conventional insect traps employing exposed tacky surfaces, it has been suggested to enclose or house a member having a tacky surface so the insects are trapped in the interior of the device. In this way, the insects are less likely to escape and there is less possibility of contamination from such devices. Generally, these devices include a housing which have appropriate openings to admit the insects. A surface of the interior of the housing is coated with an appropriate tacking substance which serves to trap the insects. In some cases, bait or scented lures are used within the housing to attract the insects. Insect traps of these types are known from U.S. Pat. Nos. 3,863,384, 4,490,938, 3,708,908 and 3,968,590. Other types of insect traps are constructed from housings which contain pools of liquids for suffocating the trapped insects, such as water and oils, as well as containing insecticides or pesticides for poisoning the insects. Examples of such devices are known from U.S. Pat. Nos. 4,581,845, 4,400,903, 1,862,325, 4,476,647, 4,718,193, 3,550,308, 818,836, 920,696, 4,263,740. Non-chemical type insect traps which merely preclude the escape of the insect from a housing or other such container are known from U.S. Pat. Nos. 4,505,065 and 134,444. In addition, it is known to use glazed or slippery coated surfaces to cause the insects to fall into the trap or to prevent the insects from climbing out of the trap, as known from U.S. Pat. Nos. 4,030,233 and 713,803.

All of these types of devices and insect traps provide advantages over conventional fly paper, however, they nevertheless could be improved in terms of efficiency and convenience of use. For example, a number of these insect traps are bulking and inconvenient to place in locations to attract insects or not suitable for household use. From the foregoing, it will be apparent that there exists the need for an improved insect trap. The present invention provides an insect trap which is extremely convenient and versatile and is applicable to household, garden, field and orchard use.

SUMMARY OF THE INVENTION

One object of the present invention is to provide an insect trap which is effective in attracting and catching insects, particularly flying insects, which are found in and around the home.

Another object of the present invention is to provide an insect trap which incorporates both an adhesive substance and an odor producing compound, which odor producing compound attracts flying insects to the adhesive so that the adhesive is effective in capturing the insects.

Another object of the present invention is to provide an insect trap which may be constructed from a decorative housing so as to be esthetically pleasing when used in the home.

Another object of the present invention is to provide an insect trap which is economical to manufacture so that it may be disposed of upon expiration of its useful life.

Another object of the present invention is to provide an insect trap which is non-obtrusive and safe for use in the vicinity of storage foods and food products, as well as around children and household pets.

In accordance with one embodiment of the present invention there is provided an insect trap constructed of a housing having a base and a top, the top is moveable relative to the base to provide an opening communicating with the interior of the housing, attraction odor producing means within the housing being at least partially exposed to the interior of the housing upon movement of the top to provide the opening.

In accordance with another embodiment of the present invention, there is provided an insect trap constructed of a housing having a base and a top, first means within the top and second means within the base cooperating with each other to permit movement of the top relative to the base between an open position and a closed position, attractant odor producing means within the housing, and means within the housing for exposing at least a portion of the attractant odor producing means to the interior of the housing upon movement of the top to the open position.

In accordance with another embodiment of the present invention, there is provided an insect trap constructed of a housing having a top and a base, a first elongated member attached to the top and extending within the interior of the housing, a second elongated member attached to the base and extending within the interior of the housing, the first member telescopically engaging the second member to permit movement of the top relative to the base between an open and closed position, the top and base forming an opening therebetween in communication with the interior of the housing when the top is in the open position, attractant odor producing means received within the second member, at least a portion of the attractant odor producing means being exposed to the interior of the housing upon movement of the top from the closed to the open position, and adhesive means provided on at least a portion of the interior surface of the housing.

In accordance with another embodiment of the present invention, there is provided an insect trap constructed of a housing having an opening communicating with the interior thereof, a slippery coating on the inside surface of the housing adjacent the opening and an adhesive coating on the inside surface of the housing adjacent the slippery coating.

BRIEF DESCRIPTION OF THE DRAWINGS

The above description, as well as further objects, features and advantages of the present invention will be more fully understood with reference to the following detailed description of an insect trap, when taken in conjunction with the accompanying drawings, wherein.

DETAILED DESCRIPTION

Figure 1:
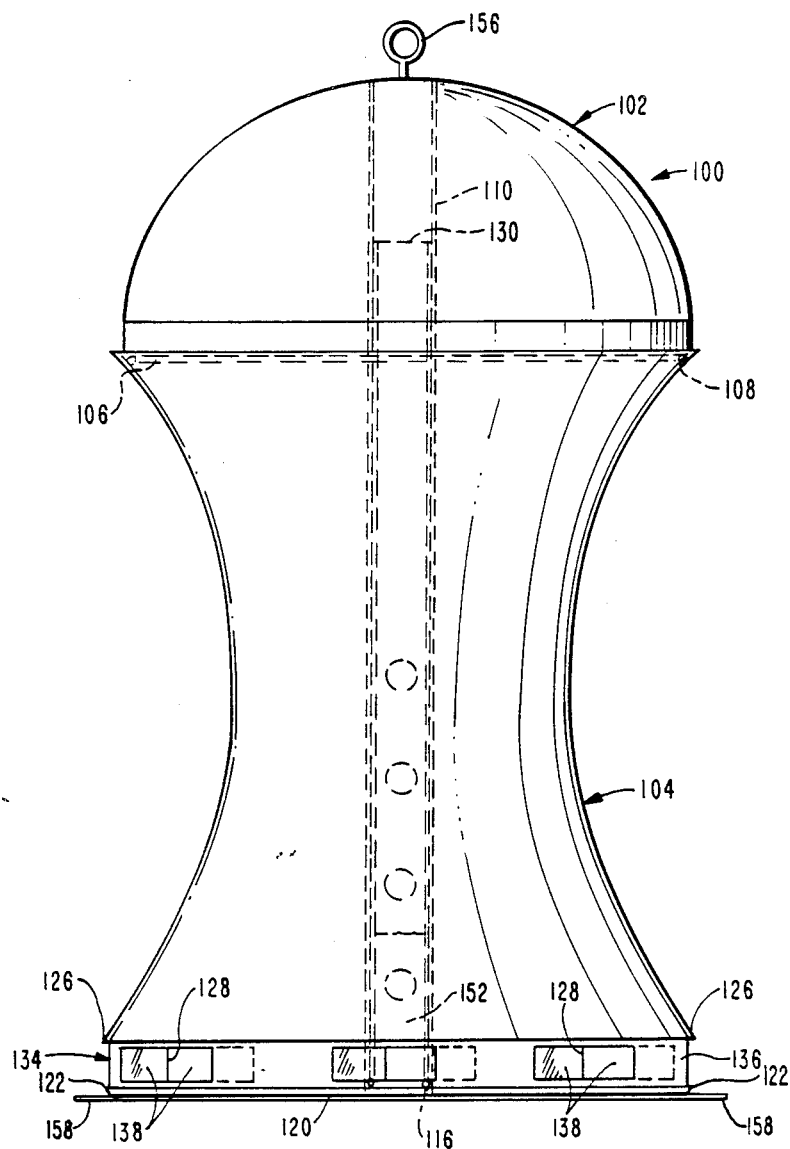
FIG. 1 is a front elevational view showing an insect trap constructed in accordance with one embodiment of the present invention.
Figure 2:
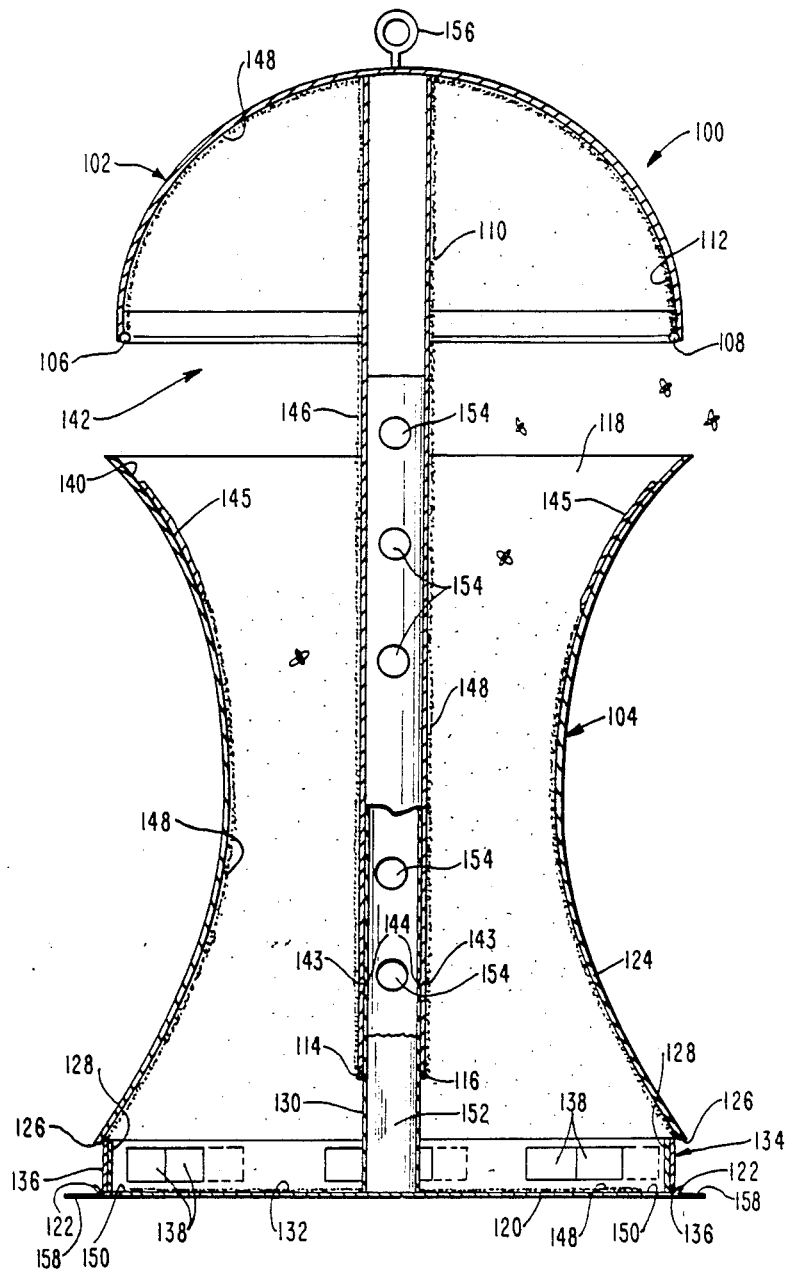
FIG. 2 is a front elevational view, in partial cross-section, showing the insect trap in an operable arrangement.

Referring now to the drawings, specifically FIGS. 1 and 2, there is disclosed an insect trap which has been designated generally by reference numeral 100. When considering the figures, it is to be noted that like elements are given like reference numerals. The insect trap 100 is constructed of a top 102 and a base 104 which, in accordance with the preferred embodiment, are formed from plastic material by injection molding and the like. In this regard, the plastic material may be transparent or colored, as well as being provided with exterior decorations and configured into an ornamental or decorative shape suitable for being used in a household environment. The top 102 is constructed in spherical form terminating at a circumferential edge 106 which may include provisions for receiving a resilient 0-ring 108. An elongated longitudinally extending tubular member 110 is attached to the central portion of the inner surface 112 of the top 102 and extends outwardly therefrom to an extent as to be described hereinafter. The leading edge 114 of the tubular member 110 may likewise support a resilient 0-ring 116. 0-rings 108 and 116 are provided to perform a sealing function as to be described hereinafter.

The base 104 is likewise constructed of suitable plastic material and is shown having an hourglass shape. It is to be appreciated that other shapes may be employed, such as cylindrical, rectangular, oval and the like. The base 104 is provided with an open mouth 118 and an opposing base bottom 120 provided with an upturned circumferential flange 122. The cylindrical side 124 of the base 104 extends downwardly from its mouth 118 to a downwardly directed flange 126 opposing flange 122. Cylindrical side 124 is joined to the base bottom 120 by means of an inner ring shaped member 128. An elongated longitudinally extending tubular member 130 is secured to the inner surface 132 of the base bottom 120 at a central location and extends upwardly through the base 104 to an extent to be described hereinafter. Although the base 104 has been described as being constructed from a plurality of individual components, it is to be understood that the cylindrical side 124, base bottom 120, flanges 122, 128 and base tubular member 130 may be integrally formed by suitable injection molding and the like.

The flanges 122, 126 are spaced apart by the inner ring shaped member 128 to form a receiving cavity 134. An outer ring shaped member 136, having an inside diameter slightly greater than the outside diameter of the inner ring shaped member 128, is received within cavity 134 and is operable for 360° of rotation therein. The inner and outer ring shaped members 128, 136 are each provided with a plurality of openings 138. These openings 138 will provide communication between the exterior and interior of the base 104 upon rotation of the outer ring shaped member 136 to bring these openings into partial or full registration with one another. FIG. 2 discloses the openings 138, in rectangular form, being in partial registration with one another.

The top 102 is assembled to the base 104 by the telescoping engagement of the base tubular member 130 within the top tubular member 110. The outer diameter of the base tubular member 130 may approximate the inside diameter of the top tubular member 110 so as to provide a friction fit therebetween. When the top is in a closed position, as shown in FIG. 1, the top tubular member 110 extends downwardly into the base 104 such that its leading edge or 0-ring 108 presses against the inner surface 132 of the base bottom 120 to provide a seal thereat. In a like manner, the circumferential edge 106 of the top 102 provides a seal by means of 0-ring 108 pressing against the inner surface 140 of the base 104 circumferentially about mouth 118. The base tubular member 130 extends a sufficient distance within the top tubular member 110 to provide stability to the insect trap 100 when in an open arrangement as shown in FIG. 2.

By displacing the top longitudinally upward, a circumferential opening 142 is provided to allow entrance of flying insects into the interior of the insect trap 100. The friction fit between the top tubular member 110 and base tubular member 130 allows the top 102 to be maintained in its open position to the extent desired. This friction engagement is facilitated by O-ring 116 which further presses against the outer surface of the base tubular member 130. In addition, the top 102 may be rotated to change its angular relationship with respect to the base 104. In the alternative, it is contemplated that the top tubular member 110 may be provided with internal threads which mate with corresponding external threads provided on the base tubular member 130. In this regard, the top 102 will be opened by rotating the top about its longitudinal axis which runs through the center of the top tubular member 110. A positive releasable locking mechanism may be provided by a projecting detent 143 circumscribing hte inner surface of the top tubular member 110 and engagable within a corresponding groove 144 provided about the outer surface of the base tubular member 130.

A slippery coating 145, in the form of a wide band, is placed on the inside surface 140 of the base 104 adjacent its mouth 118. The slippery coating 145 will, in effect, cause flying insects which land thereon to take flight and either land on or be accidentally trapped by an adhesive material as to be described. Suitable slippery coatings 144 include waxed materials, soaps, fatty substances, surfactants and the like.

The interior surfaces 112, 132 and 140 of the top 102, base bottom 120 and base 104, as well as the exterior surface 146 of the top tubular member 110 may be coated with an adhesive layer 148 for trapping and holding insects upon contact. In regard to the base bottom 120, an annular ring 150 is provided circumferentially about the inner surface 132 of the base bottom which is free of the adhesive layer 148. This adhesive free annular ring 150 permits flying and crawling insects to completely enter the interior of the insect trap 100 through the aligned plural openings 138 without being trapped thereat and accumulating within these openings. The adhesive layer 148 must be tack and pressure sensitive within a wide range of temperatures, and in addition, must be non-viscous or non-flowing at normal temperatures so that it will remain on the coated surfaces during storage and use. One such adhesive which is tacky and pressure sensitive over a temperature range of from 20° F. to 120° F. is produced by Findley Adhesives, Inc. of Elm Grove, Wisconsin and designated as product No. X793-334-09. Other adhesives suitable for use with the present invention are disclosed in U.S. Pat. No. 3,968,590.

In order to attract insects into the interior of the insect trap 100, a bait or scented lure in the nature of an attractant odor producing material 152 is used. The odor producing material 152 is inserted into the lower portion of the base tubular member 130. The odor producing material 152 may be selected from a variety of materials such as pheromone, a mixture of honey and sugar, a molasses fragrance from Florasymth, Inc., New York, New York mixed with sugar, an ammonia producing material and the like. The odor producing material 152 may be provided as a solid or semi-solid substance and having different scents to attract different insects. In regard to the ammonia producing material, it is known that all insects are attracted to such an odor. The odor level of the ammonia can be sufficiently low so as to be unobjectionable in the environment of the insect trap 100, but still sufficiently strong to cause fully-effective insect attracting. Any convenient air-evaporating ammonia source is useful and such chemical compounds are well-known in the chemical arts. For example, ammonium carbonate breaks down fairly rapidly to produce ammonia. Similarly, urea breaks down to produce ammonia, although somewhat slower except in the presence of bacteria. Other odor producing materials are known from U.S. Pat. No. 3,968,590. It is also contemplated that a portion of the odor producing material 152 may be mixed with the adhesive layer 148.

The use and operation of the insect trap 100 will now be described. The insect trap 100 is initially supplied to the user in the closed position as shown in FIG. 1. The odor producing material is effectively contained within a sealed compartment within the interior of base tubular member 130 by means of the seal created by means of the 0-ring 116 and the friction fit between top tubular member 110 and base tubular member 130. The top tubular member 110 and base tubular member 130 are each provided with a plurality of openings 154. As the top 102 is pulled upwardly from the base 104, opening 142 is provided, while at the same time, openings 154 of the top tubular member 110 and base tubular member 130 may be brought into registration with one another. The odor or fragrance from the odor producing material 152 may now escape from within the base of the base tubular member 130 by means of the aligned openings 154 and permeate the interior of the insect trap 100. In addition, it is contemplated that the base of the base tubular member 130 may be provided with a plurality of cut outs (not shown) which will achieve the same function and allow elimination of the openings 154. This registration may be achieved by withdrawing the top 102 upwardly from the base 104, as well as rotating same about its longitudinal axis. The registration of the openings 154 may be facilitated by means of alignment marks (not shown) on the exterior surfaces of the top 102 and base 104. In addition, a stop pin (not shown) may be provided to limit the extent of rotation of the top 102 with respect to the base 104 to affect the desired alignment.

Once the insect trap 100 has been opened, it may be placed on a table or other supporting surface by means of the base 120 in an upstanding manner. In addition, the insect trap 100 may be suspended from a hook by means of loop 156. In either event, flying insects, as well as crawling insects, can enter the interior of the insect trap 100 through opening 142 and the plural openings 138 provided about the lower portion of the base 104. These insects are attracted into the interior of the trap 100 by means of the odor producing material 152. Once inside the insect trap 100, these insects are trapped by the adhesive layer 148 until they expire. In the case of flying insects entering through opening 142, such insects may initially land on the slippery coating 145. In this event, the slippery coating 145 will tend to cause the insects to take flight thereby ultimately landing on or being accidentally trapped by the adhesive layer 148. Once the useful life of the insect trap 100 has expired, it may be closed to seal the contents thereof, i.e., expired insects and readily disposed of.

It should be understood that the insect trap 100 may be constructed in other forms and shapes then that disclosed herein and in the drawings. In addition, the insect trap 100 may be constructed in a variety of sizes, for example, relatively small for household use, while exceedingly large for commercial and orchard applications. Thus, the insect trap 100 of the present invention has extreme versatility for the user.

Although the invention herein has been described with references to particular embodiments, it is to be understood that the embodiments are merely illustrative of the principles and application of the present invention. For example, the base bottom 120 may be extended to form a lip 158 surrounding the outer ring shaped member 136 in order to provide a place for insects to land before entering the trap 100 via openings 138 when the trap is hung by means of loop 156. It is therefore to be understood that numerous modifications may be made to the embodiments and that other arrangements may be devised without departing from the spirit and scope of the present invention as defined by the claims.

What is claimed is:

1. An insect trap comprising a housing having a base and a top, said top moveable relative to said base to provide an opening communicating with the interior of said housing, attraction odor producing means within said housing being at least partially exposed to the interior of said housing upon movement of said top to provide said opening, and a pair of telescopically arranged members within said housing and respectively attached to said top and said base, said members permitting movement of said top relative to said base between an open and closed position, said top when in said open position providing said opening in communication with the interior of said housing.

2. The insect trap of claim 1, further including first sealing means for creating a seal between said top and said base, and second sealing means for creating a seal between one of said members and said base.

3. The insect trap of claim 1, wherein said attraction odor producing means is arranged within said member attached to said base, said members having a plurality of openings which, when in registration with each other, provide communication between the interior of said housing and said attraction odor producing means.

4. The insect trap of claim 1, further including an adhesive coating on at least a portion of the interior surfaces of said housing.

5. The insect trap of claim 1, wherein said base is provided with a plurality of openings arranged about a circumferential portion thereof and a sealing ring having corresponding openings rotatably arranged overlying said circumferential portion, wherein when said openings are in alignment with one another said openings provide communication with the interior of said housing.

6. The insect trap of claim 5, wherein said base includes a bottom surrounded by said circumferential portion, said bottom having an annular region adjacent said circumferential portion, and an adhesive coating on the inside surface of said bottom except within said annular region.

7. An insect trap comprising a housing having a base and a top, first means within said top and second means within said base cooperating with each other to permit movement of said top relative to said base between an open position and a closed position, attractant odor producing means within said housing, and means within said housing for exposing at least a portion of said attractant odor producing means to the interior of said housing upon movement of said top to said open position.

8. The insect trap of claim 7, wherein said top provides an annular opening circumscribing said housing when said top is in said open position, said annular opening being in communication with the interior of said housing. ( /

9. The insect trap of claim 8, wherein said first means comprises a first tubular member and said second means comprises a second tubular member, said first and second tubular members being telescopically engaged to permit longitudinal movement of said top relative to said base to provide said annular opening.

10. The insect trap of claim 9, wherein said attractant odor producing means is arranged within one of said tubular members.

11. The insect trap of claim 7, wherein said attractant odor producing means is arranged within said second means, said first and second means having a plurality of openings which, when in registration with each other, provide communication between the interior of said housing and said attraction odor producing means.

12. The insect trap of claim 7, wherein said base is provided with a plurality of openings arranged about a circumferential portion thereof and a sealing ring having corresponding openings rotatably arranged overlying said circumferential portion, wherein when said openings are in alignment with one another said openings provide communication with the interior of said housing.

13. The insect trap of claim 12, further including an adhesive coating on at least a portion of the interior surfaces of said top, said base, and said first means, said base including a bottom having an annular region adjacent the peripheral portion thereof, said adhesive coating being provided on the inside surface of said bottom except within said annular region.

14. An insect trap comprising a housing having a top and a base, a first elongated member attached to said top and extending within the interior of said housing, a second elongated member attached to said base and extending within the interior of said housing, said first member telescopically engaging said second member to permit movement of said top relative to said base between an open and closed position, said top and said base forming an opening therebetween in communication with the interior of said housing when said top is in said open position, attractant odor producing means received within said second member, at least a portion of said attractant odor producing means being exposed to the interior of said housing upon movement of said top from said closed to said open position, and adhesive means provided on at least a portion of the interior surface of said housing.

15. The insect trap of claim 14, further including first sealing means for creating a seal between said top and said base, and second sealing means for creating a seal between said first elongated member and said base.

16. The insect trap of claim 14, wherein said base is provided with a plurality of openings arranged about a circumferential portion thereof and a sealing ring having corresponding openings rotatably arranged overlying said circumferential portion, wherein when said openings are in alignment with one another said openings provide communication with the interior of said housing.

17. The insect of claim 16, wherein said adhesive means is provided on at least a portion of the interior surfaces of said top, said base and said first elongated member, said base including a bottom surrounded by said circumferential portion, said bottom having an annular region adjacent said circumferential portion, and said adhesive means provided on the inside surface of said bottom except within said annular region.

18. An insect trap comprising a housing having an opening communicating with the interior thereof, said housing including a top and a base, said top being moveable relative to said base to provide said opening, a slippery coating on the inside surface of said housing adjacent said opening, and an adhesive coating on the surface of said housing adjacent said slippery coating.

19. An insect trap comprising a housing having a base and a top, said top moveable relative to said base to provide an opening communicating with the interior of said housing, and attraction odor producing means within said housing being at least partially exposed to the interior of said housing upon movement of said top to provide said opening, said base provided with a plurality of openings arranged about a circumferential portion thereof and a sealing ring having corresponding openings rotatably arranged overlying said circumferential portion, wherein when said openings are in alignment with one another said openings provide communication with the interior of said housing, said base including a bottom surrounded by said circumferential portion, said bottom having an annular region adjacent said circumferential portion, and an adhesive coating on the inside surface of said bottom except within said annular region.

* * * * *

UNITED STATES PATENT AND TRADEMARK OFFICE
CERTIFICATE OF CORRECTION

PATENT NO. : 4,930,251

DATED : June 5, 1990

INVENTOR(S) : Crisanti

It is certified that error appears in the above-identified patent and that said Letters Patent is hereby corrected as shown below:

Col 8. line 48, after "the" insert --inside--.

Signed and Sealed this

Twenty-seventh Day of April, 1993

Attest:

MICHAEL K. KIRK

*Attesting Officer*   Acting Commissioner of Patents and Trademarks